United States Patent [19]  
Crockett et al.

[11] Patent Number: 4,793,719  
[45] Date of Patent: Dec. 27, 1988

[54] PRECISION ROLLER BEARING ROCK BITS

[75] Inventors: David P. Crockett, Mission Viejo; Gerard P. Erpenbeck, Costa Mesa; Michael E. Hooper, Mission Viejo, all of Calif.

[73] Assignee: Smith International, Inc., Newport Beach, Calif.

[21] Appl. No.: 122,156

[22] Filed: Nov. 18, 1987

[51] Int. Cl.⁴ .................. E21B 10/22; F16C 19/26; F16C 33/58

[52] U.S. Cl. .................................. 384/92; 175/371; 384/93; 384/548; 384/569

[58] Field of Search ............... 384/92, 96, 537, 543, 384/544, 548, 557, 559, 569, 584–586; 175/371, 372

[56] References Cited  
U.S. PATENT DOCUMENTS 2,030,442 10/1933 Garfield et al. .  
2,644,671 7/1953 Ingram ...................... 175/372 X  
2,983,560 5/1961 Pitner ........................... 384/548  
3,178,241 4/1965 Braunagel .................... 384/557  
3,193,028 7/1965 Radzimovsky .............. 384/92 X  
3,797,900 3/1974 Secola ........................ 384/537 X  
3,990,525 11/1976 Penny .  
4,136,748 1/1979 Dickerhoff .  
4,249,781 2/1981 Olschewski et al. .  
4,255,000 3/1981 Olschewski et al. .  
4,256,193 3/1981 Kunkel et al. .  
4,263,976 4/1981 Lachonius .  
4,359,113 11/1982 Morris .  
4,367,904 1/1983 Olschewski et al. .  
4,386,668 6/1983 Parish .  
4,428,687 1/1984 Zahradnik .

OTHER PUBLICATIONS  
Spotts, *Design of Machine Elements*, 12/78, pp. 397–415.

Primary Examiner—Stuart S. Levy  
Assistant Examiner—Thomas R. Hannon  
Attorney, Agent, or Firm—Robert G. Upton

[57] ABSTRACT

A sealed bearing roller cone rock bit is disclosed having precision roller bearings with very close fits. The bearing package includes highly refined and hardened surface finishes, special roller bearing metal materials and lubricants with specific lube viscosities.

10 Claims, 3 Drawing Sheets

PRECISION ROLLER BEARING ROCK BITS

BACKGROUND OF THE INVENTION

1. Field of the Invention

This invention relates to sealed bearing rotary cone rock bits.

More particularly, this invention relates to precision roller bearings for seal bearing rotary cone rock bits.

2. Description of the Prior Art

Roller bearings for rotary cone rock bits have been in the public domain for many years. Roller bearing "air" bits are typically used in open pit mines where a multiplicity of shallow holes are formed in the earth formations. These types of roller bearing rotary cone bits usually are non-sealed bits that rely on a gaseous fluid to lubricate the bearings and to flush the bearings of debris during use of the bit in a borehole. These types of mining bits utilize cylindrical roller bearings that are loosely confined (large bearing clearances) by bearing races formed between a journal and a rotary cutter cone. These open-type bearings encourage the flushing of detritus from the bearing cage by the gaseous fluid pumped under pressure through a connecting drill string.

Prior art U.S. Pat. Nos. 2,030,442, 3,990,525, 4,255,000, 44,359,113 and 4,386,668 represent rock bits that operate under the foregoing parameters.

Sealed bearing rotary cone rock bits that incorporate cylindrical type roller bearings are typically run in a deep well borehole with drilling fluid or "mud" to move the debris from the borehole bottom to the rig floor.

The following U.S. Pat. Nos. 4,249,781, 4,256,193, 4,263,976 and 4,428,687 teach sealed lubricated roller bearings for rotary cone rock bits.

Still another type of rotary cone rock bit utilizes conical bearings oriented between journals and rotary cones. The conical bearings take both radial and axial loads during operation of the bit in a borehole.

U.S. Pat. No. 4,136,748 teaches an open bearing rotary cone rock bit (air bit) with conical bearings that utilizes a gaseous fluid to lubricate and flush the bearings.

U.S. Pat. No. 4,367,904 teaches a sealed bearing rotary cone rock bit that uses conical bearings that are internally grease lubricated through a closed lube reservoir system.

The prior art does not teach a precision roller bearing having very close fits. The bearing package of the present invention includes highly refined surface finishes that complement extremely hard roller bearing elements fabricated from special bearing metals. A specific lubricant is utilized having lube viscosities that are unique to the bearing combination of the instant invention.

SUMMARY OF THE INVENTION

It is an object of this invention to provide a sealed precision roller bearing having very close fits. The bearing package includes highly refined and hardened surface finishes, special roller bearing metal materials and lubricants with specific lube viscosities.

A sealed bearing rotary cone rock bit consists of a rock bit body having a first pin end and a second cutter end. The body forms at least one leg that extends from the body toward the second cutter end. The leg forms a journal bearing adapted to support a rotary cutter cone rotatively secured thereon. The cone forms a cylindrical cavity to accept the journal. A roller bearing assembly includes inner and outer races that confine a multiplicity of cylindrical bearings. The bearing assembly is installed into the cylindrical cavity formed by the cone. The installment method may be by pressing, shrink or expansion fit (thermal process) or slip fit. The bearing elements may be installed simultaneously or sequentially. The diametrical clearance between an outside surface of the inner race, a surface of the multiplicity of cylindrical roller bearings and an inside surface of the outer race is between plus 0.004 inch to minus 0.002 inch. An inside surface of the inner race has a diametrical clearance between a surface of the journal of between 0.000 inch to 0.007 inch.

The utilization of tight roller bearing fits for rock bits wherein there is a minimum radial clearance between an inner race, the roller bearings, and an outer race adjacent, for example, a cone mouth opening, is particularly unique. Moreover, a bearing combination wherein bearing surface finishes less than 20 Ra microinch coupled with high cleanliness steel bearing elements with a Rockwell C hardness of 58, the bearings being lubricated with grease having a viscosity greater than 100 CP at 212° F. is especially unique in the rock bit industry.

An advantage then, over the prior art, is a bearing combination that provides a sealed precision roller bearing having tight fits with highly refined and hardened surface finishes in combination with lubricants having specific lube viscosities.

The above-noted objects and advantages of the present invention will be more fully understood upon a study of the following description in conjunction with the detailed drawings.

BRIEF DESCRIPTION OF THE DRAWINGS

FIG. is a perspective view of a typical rotary cone rock bit.

DESCRIPTION OF THE PREFERRED EMBODIMENTS AND BEST MODE FOR CARRYING OUT THE INVENTION

Figure 1:
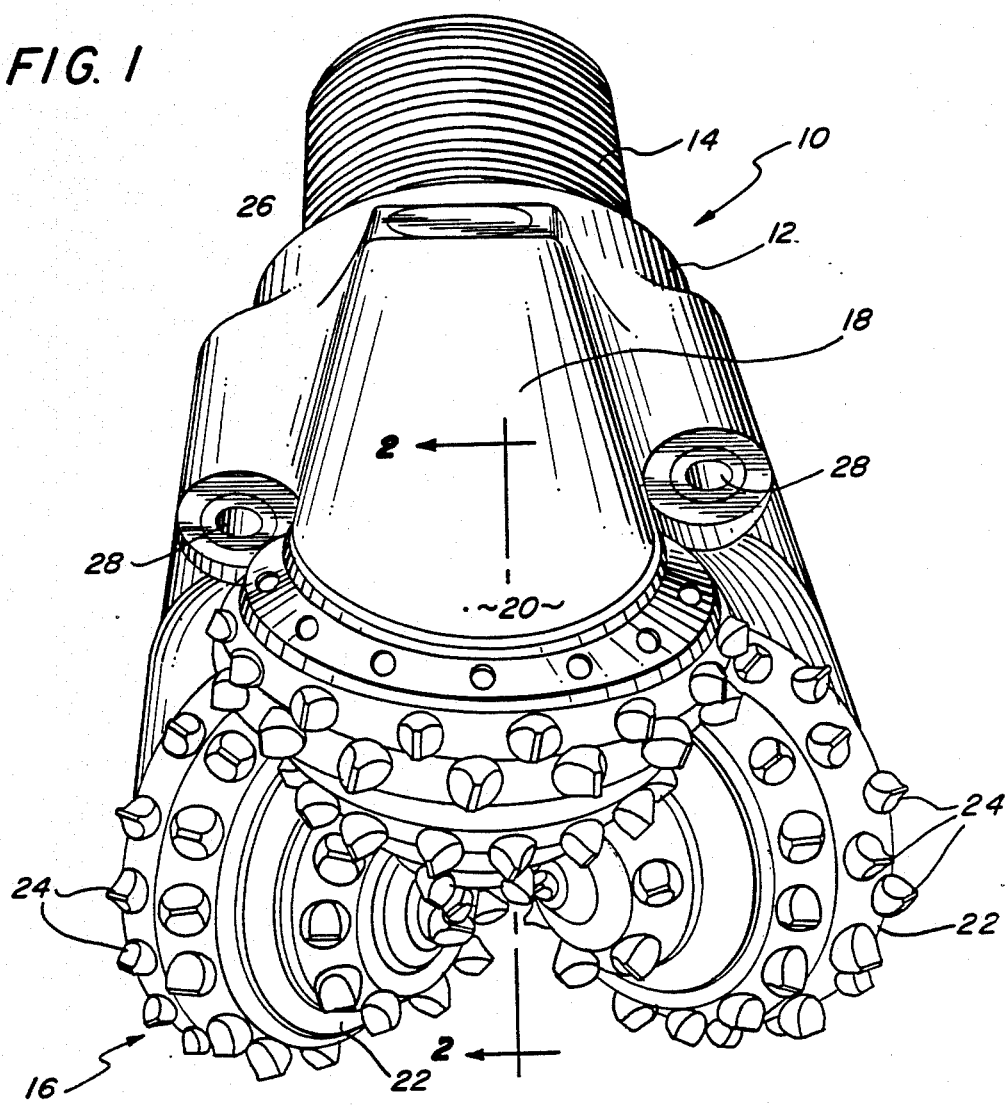

FIG. 1 illustrates a typical rotary cone rock bit generally designated as 10 which consists of a rock bit body 12 pin end 14 and a cutting end, generally designated as 16. The cutting end comprises rotatable cutter cones 22 that are attached to a leg portion 18 near shirttail 20. Each of the cones 22 has, for example, a multiplicity of cutter inserts 24 retained by the cone 22. Drilling fluid commonly known as "mud" is directed into a plenum chamber formed by body 12 (not shown) through pin end 14. The fluid or mud is then directed from the chamber out nozzles 28.

Figure 2:
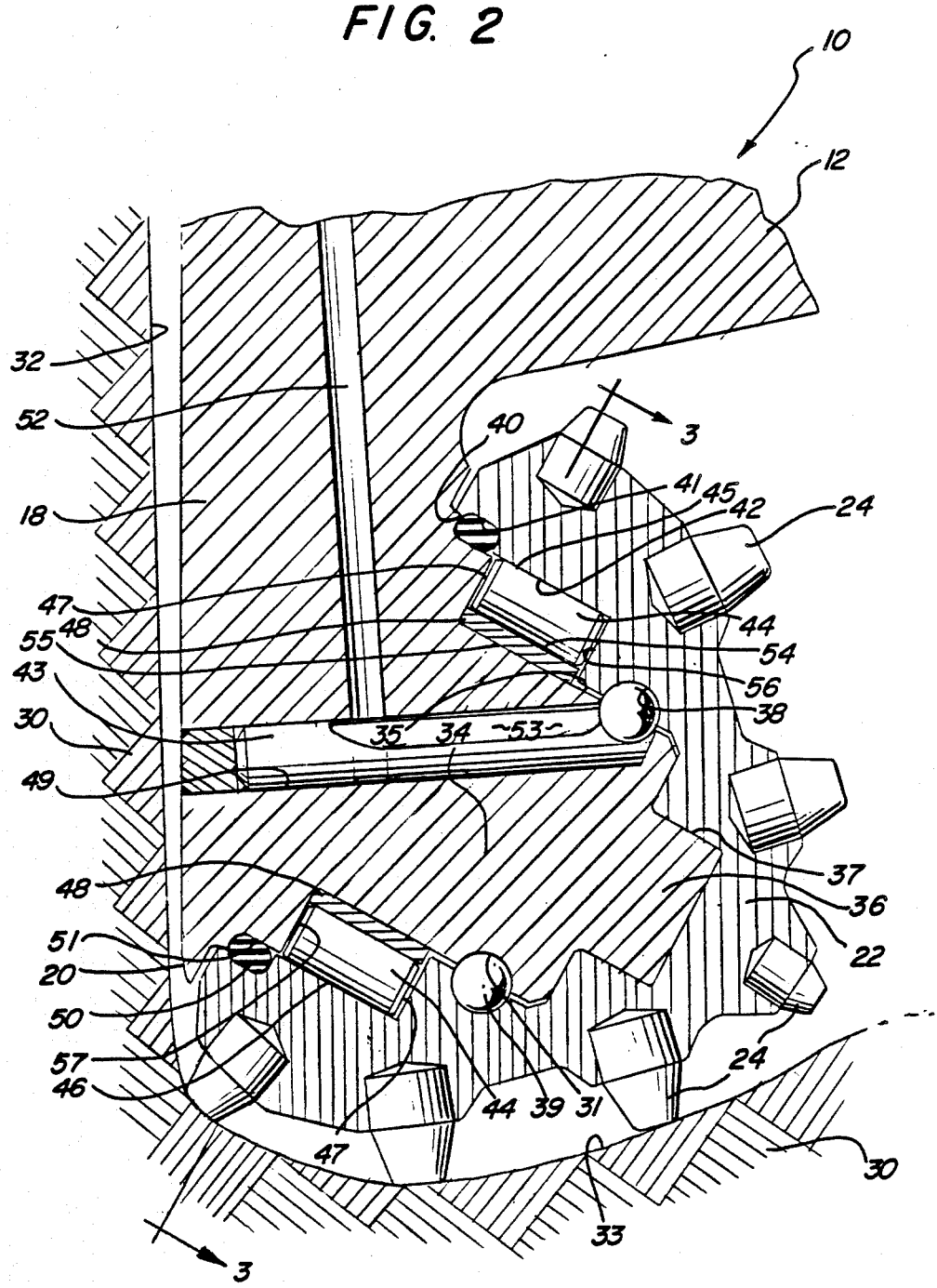
FIG. 2 is a partially broken away cross-section of a roller cone mounted to a journal bearing cantilevered from a leg of a rock bit taken through 2—2 of FIG. 1.

Turning now to FIG. 2 the leg 18 of the bit 10 defines a journal 34 cantilevered from the shirttail end 20 of leg 18. A spindle 36 is formed on the end of the main journal 34, the spindle acting to stabilize the rotary cone 22 mounted on the journal 34. The cone 22 forms a cone mouth 40 which transitions into a bearing retaining groove or race 42. The cone 22 is secured to the journal 34 by a multiplicity of cone retention balls 39. A ball race 38 is formed within the cone 22 which registers with a similar ball race 31 formed in the journal 34. Balls are inserted through a ball hole 49. When the ball races 31 and 38 are full of ball bearings 39, a ball hole plug 43 is inserted in the ball hole 49 to close out the ball race 31.

With reference again to FIG. 1, a lubricant is supplied to the bearings through a lubricant reservoir 26 down lube hole 52 (FIG. 2) into the ball plug hole 49. A groove 53 is provided in the ball plug 43 to enable the lubricant to reach the bearings confined between the cone 22 and the journal 34.

Roller bearings 44 are retained within an inner bearing race 48 and the annular bearing race 42 formed in cone 22. The O.D. 54 of the inner bearing race 48 is sized to tightly engage the surface 45 of roller bearing 44 thereby tightly engaging the cylindrical bearings with the race 42 formed in cone 22. The bearing clearance between surface 54 and surface 42 is between plus 0.004 inch to minus 0.002 inch. The preferred ranged is plus or minus 0.001 inch. The material surface hardness of all of the bearing elements including the outer surface of the inner race 48, the roller bearings 44, and the outer race 42 formed in cone 22 is within a Rockwell C hardness range between 58 Rc to 65 Rc. A preferred range for the material hardness is 60 to 62 Rockwell C. The surface finish of all of the bearing elements are as follow: for the inner race outer surface 54, the surface should be less than 32 Ra microinch, the inner surface of the outer race 42 should be less than 32 Ra microinch and the surface of the roller bearings should be less than 24 Ra microinch. It would be desirable that the surface finish of all of the bearing elements be within 10 Ra microinch one from the other. The preferred range of surface finish of the bearing elements are as follows: inner surface of the outer race should be less than 20 Ra microinch, the outer surface of the inner race should be less than 16 Ra microinch and the roller bearing should be less than 12 Ra microinch. The clearance between the outside surface 35 of journal 34 and the inside diameter 55 of the inner race 48 should be about 0.004 inch. A preferred clearance would be about 0.001 inch. The ends 47 of roller bearings 44 are prevented from engaging or binding against the leg hub 57 and axial surface 56 formed in cone 22 by the length of the inside bearing race 48. A seal is provided between the cone mouth 40 and the journal bearing 34. The seal 50 rides on a seal gland 41 formed in the rotary cone 22. The inside diameter of the seal 50 rides in a complementary seal gland 51 formed at the base of the journal 34.

Additionally, the roller bearings 44 are preferably crowned along their axial length at 46 thus preventing stress risers at either end of the roller bearings which may exist if the cone 22 should become misaligned with the journal 34 (not shown) or heavily loaded. By crowning the roller bearings at 46, stress risers are minimized within the bearing package. It would also be obvious to crown the O.D. of the inner bearing race and the I.D. of the outer bearing race (not shown).

Moreover, the bearing elements are preferably fabricated from a high cleanliness steel which assures uniform quality of the elements. The steel should be free of inclusion or contaminants. In determining the nonmetallic inclusion content of steel, a number of recognized methods are used. For example, the 1985 *Annual Book of ASTM STANDARDS,* Volume 03.03 *Metallography; Nondestructive Testing,* sets forth on pages 61 through 74, several of these methods. Typical nonmetallic inclusions in steel are: (A) sulfide, (B) alumina, (C) silicate, and (D) globular oxides A "J. K." (JERKONTORET) chart categorizes these inclusions in columns and rates the inclusions from 1 to 5; 1 being low in content and 5 is high in content. An acceptable J. K. rating would be a range from 1 to 3. The preferred J. K. rating, of course, would be 1 for the steel used to fabricate the bearing elements of the present invention The lubricant, or grease, utilized to lubricate the bearings should have a lubricant viscosity of greater than 100 centipoise, a preferred lubricant would have a viscosity of 500 to 5,000 centipoise (Cp) at 212 degrees Fahrenheit. An example of a lubricant having these properties is manufactured by Dow Chemical Company of Midland, Michigan, and has a product designation of FS-1265-10,000 with a centipoise of 840 at 212 degrees Fahrenheit. Another example of a lubricant having an acceptable centipoise range is fabricated from Sta-Lube Corporation of Compton, California, with a product designation of 38995 having a centipoise of about 100 at 212 degrees Fahrenheit. Still another example of a satisfactory lubricant is manufactured by Mobiltac of New York, N.Y., and is known under the designation of QQ with a centipoise of about 100 at 212 degrees Fahrenheit.

Figure 3:
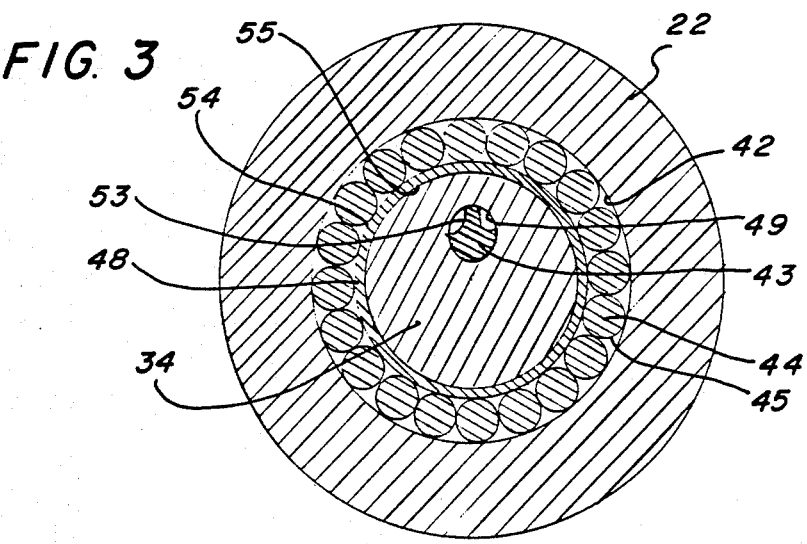
FIG. 3 is a view taken through 3—3 of FIG. 2 illustrating the roller bearings mounted within a cone mouth of the roller cone.

Given a bearing assembly having the foregoing parameters as described with respect to FIGS. 1, 2 and 3, the bearing misalignment between the journal 34, and the cone 22 would be minimal. A preferred bearing misalignment would be less than 0.001 radian. The preferred degree of misalignment would be less than 0.06 degrees. It would, however, be acceptable if there is a misalignment of up to plus or minus 0.15 degrees between the journal and the cone.

Cone misalignment on the journal 34 happens when a rock bit typically is run in a borehole 32, as shown in FIG. 2. The borehole bottom 33 and the weight on the bit co-act to create an out thrust load on the cone 22 (out thrust being pressure exerted from the tip of the cone 22 towards the shirttail 20 of the leg 18). The loaded cone 22 tends to misalign itself with the journal 34, the load side of the journal 34, of course, being toward the bottom of the journal 34, as seen in FIG. 2. It is understandable then, that proper cone alignment with its respective journal bearing is critical and, as taught in the present invention the tight bearing package as heretofore described, minimizes the possbility of cone misalignment. When cone misalignment becomes severe, it seriously diminishes the longevity of the rotary cone rock bit operating in a borehole. By providing a bearing package with close tolerances coupled with very hard surfaces and a highly refined surface finish, the longevity of the rock bit in a borehole is considerably enhanced.

Referring now to FIG. 3, the cross-section taken through FIG. 2, illustrates the cone 22 mounted to journal 34 with the bearings 44 confined between hardened and polished surface 42 in cone 22 and the O.D. hardened surface 54 of inner race 48. The preferred fit, again, between the hardened surface 54, the surface 45 of roller bearings 44, and the hardened surface 42 of cone 22 is preferably plus or minus 0.001 inch. The clearance between surface 56 of journal 4, and I.D. 55 of bearing race 44, is preferably about 0.001 inch. The ball plug hole 49 is also illustrated in this view showing the ball plug 43 and the grease passages 48 formed in the ball plug 43 to allow lubricant from the lubricant reservoir to the bearing package.

Figure 4:
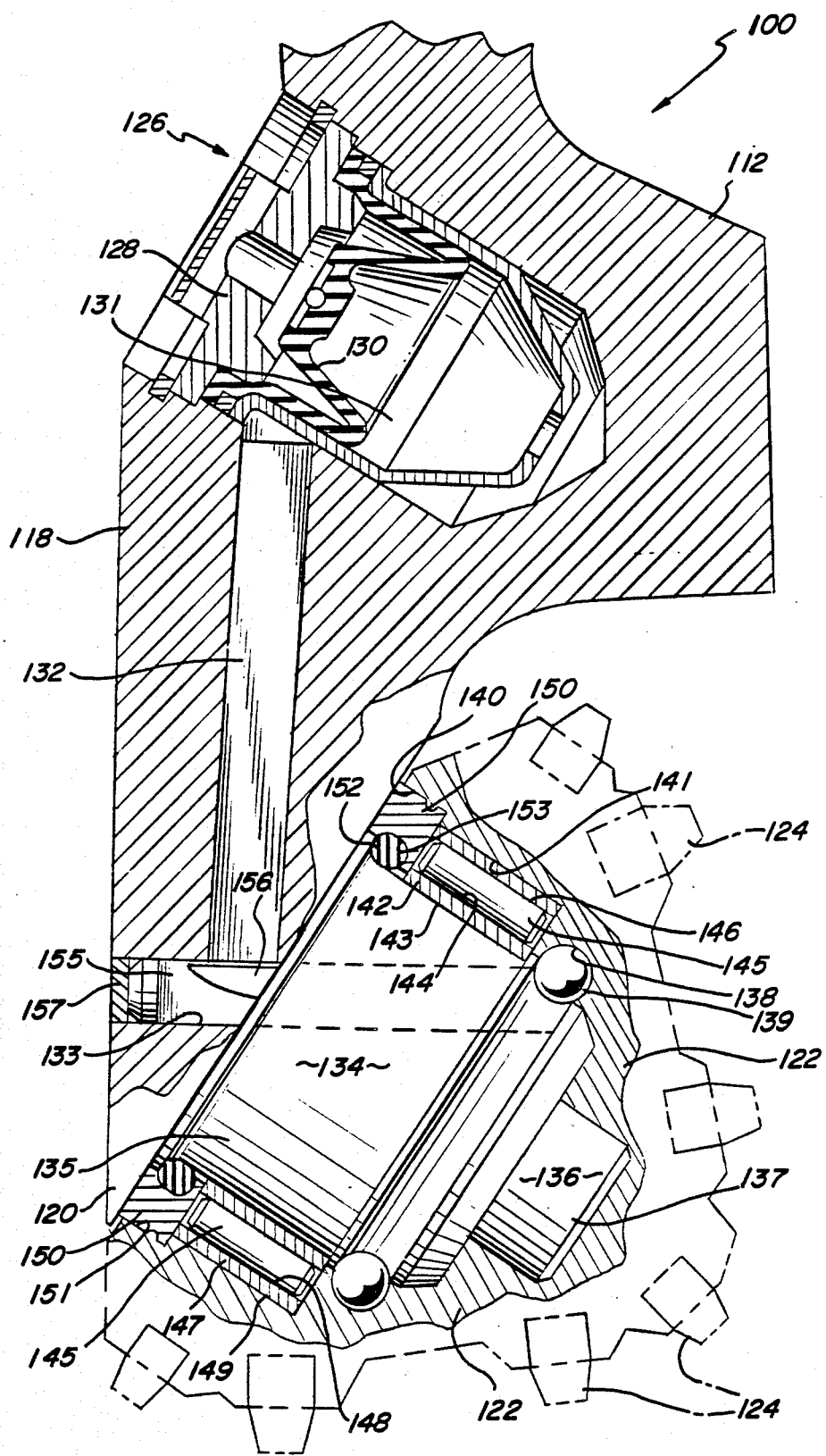
FIG. 4 is a partially broken away cross-section of an alternative roller bearing assembly for a sealed bearing roller cone rock bit.

Turning now to an alternative embodiment illustrated in FIG. 4, a rotary cone 122 is mounted to a journal 134 which is cantilevered from a leg 118 adjacent shirttail portion 120. The leg portion 118, is shown with a lubricant reservoir system generally designated as 126. This type of lubricant reservoir is typical of the preferred embodiment of FIGS. 1, 2 and 3. The lubricant reservoir system represents the state of the art and typically includes a flexible diaphragm 130 mounted within a reservoir chamber which is held in place by a cover cap 128. The diaphragm is exposed to the exterior of the rock bit so that it may be pressure compensated between the interior cavities of the bit and the outside environment of the bit. Lubricant 131 is forced into a space between the interior of the diaphragm and is directed through lubricant passage 132 found in the leg 118 towards a ball hole plug 133. Groove 156 in a ball plug 155 allows the lubricant to pass into the ball race 138 in cone 122 so that the lubricant can be routed to the cone retention ball race 138, balls 139 and the roller bearing package.

A cone mouth 140, is formed in the rotary cone 122 which leads into a bearing retention groove 141 formed in cone 122. A bearing package which includes an inner race 142, roller bearings 145, and outer bearing race 147, completes the bearing package. The outer bearing race 147 is designed to be interference fitted or press fitted within bearing groove 141, formed in cone 122. The clearances between the outside diameter surface 144, of inner race 142, the surface 146 of roller bearing 145 and the inner or I.D. surface 148 of outer race 147 is between a plus 0.004 inch to minus 0.002 inch. The preferred range, or clearance, is plus or minus 0.001 inch. Again, the roller bearings 144 may be crowned at 154 to prevent stress risers at the cylindrical ends of each of the roller bearings, thus accommodating for slight misalignments between the cone 122 and the journal 134. The roller bearings are prevented from binding on their ends by the length of the inner and outer bearing races 142 and 147. After the bearing package is press fitted within circular recess groove 141, the bearing is retained within the cone by a bearing retainer ring 150. The ring 150 is preferably pressed within the annular bearing retainer groove 151 positioned within the cone mouth 140 of cone 122. The annular bearing retainer ring has formed on its inside diameter a seal gland 153 to support a resilient O-ring 152 placed between the seal gland 153, and a complementary gland formed at the base of the journal bearing 134. The annular bearing retaining ring is preferably metallurgically bonded to the cone 122 at the intersection of the O.D. of the ring and the annular groove 151. It would be obvious, of course, to thread the O.D. of the bearing retainer 150 (not shown). The threaded ring would then be secured within complementary threads formed in the cone 122 (not shown). The clearance between the surface 135 of journal 134, and the I.D. 143 of inner bearing race 142, should be about 0.004 inch.

It would be obvious to eliminate the inner bearing race 48 of FIG. 2 and finish surface 35 of journal 34 as set forth in the foregoing specification. Roller bearings 44 would then be confined within surface 45 formed by the cone 22 and surface 35 formed by journal 34 without departing from the intent of the present invention (not shown).

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A sealed bearing rotary cone rock bit comprising:
   a rock bit body having a first pin end and a second cutter end, said body forming at least one leg extending from said body toward said second cutter end, said leg forming a journal adapted to support a rotary cutter cone rotatively secured thereon, said cone forming a cylindrical cavity to accept said journal;
   a precision roller bearing assembly comprising metal bearing elements that include inner and outer races that confine a multiplicity of cylindrical bearings therebetween bearing surfaces of said bearing elements have a surface finish between 20 and 32 Ra microinch, said bearing elements further are formed of steel that has a surface hardness range between 58 and 65 Rockwell C hardness, the bearing assembly is installed into said cylindrical cavity formed by said cone, a clearance between an outside surface formed by said inner race, an outer surface formed by said multiplicity of cylindrical roller bearings and an inside surface formed by said outer race is between plus 0.004 inch to minus 0.002 inch, a clearance between an outer surface formed by said journal bearing and an inside surface formed by said inner race is between 0.005 inch to 0.007 inch; and
   a lubricant to lubricate said precision roller bearing assembly, said lubricant having a lube viscosity of greater than 100 centipoise at 212° F.

2. The invention as set forth in claim 1, wherein the clearance between said outside surface of said inner race, said surface of said cylindrical roller bearings and an inside surface of said outer race is less than 0.001 inch.

3. The invention as set forth in claim 1, wherein said outer race of said bearing assembly is formed by said rotary cutter cone, said multiplicity of cylindrical bearings being pressed into said outer race formed by said cone by said inner race, a clearance between an outside surface of said inner race, a surface of said cylindrical bearings and a surface of said outer race is less than 0.001 inch.

4. The invention as set forth in claim 1, wherein said surface finish is less than 20 Ra microinch.

5. The invention as set forth in claim 1, wherein said surface hardness range is between 60 and 62 Rockwell C hardness.

6. The invention as set forth in claim 5, wherein said steel bearing elements are fabricated from a steel having high cleanliness with a J. K. rating from 1 to 3.

7. The invention as set forth in claim 6, wherein said steel cleanliness J. K. rating is 1.

8. The invention as set forth in claim 7, wherein each of the cylindrical roller bearings is crowned along its axial length, a substantially central portion along said axial length of said cylindrical roller bearing is larger in diameter than respective ends of said cylindrical bearing.

9. The invention as set forth in claim 8, wherein said inner and outer roller bearing races are crowned along their axial length, the diameter of a substantially central portion of said outer surface of said inner race is greater than the diameter at opposite ends of the inner race, the diameter of a substantially central portion of said inner surface of said outer race is less than the diameter at each end of said outer race.

10. The invention as set forth in claim 1, wherein a roller bearing assembly misalignment between said journal bearing and said roller cone is less than 0.001 microinch radian.

* * * * *